US010626640B2

(12) United States Patent
Shibayama et al.

(10) Patent No.: US 10,626,640 B2
(45) Date of Patent: Apr. 21, 2020

(54) VEHICLE DOOR OPERATION DEVICE

(71) Applicant: AISIN SEIKI KABUSHIKI KAISHA, Kariya-shi (JP)

(72) Inventors: Satoshi Shibayama, Nagoya (JP); Sadayuki Makino, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 437 days.

(21) Appl. No.: 15/513,834

(22) PCT Filed: Nov. 24, 2015

(86) PCT No.: PCT/JP2015/082938
§ 371 (c)(1),
(2) Date: Mar. 23, 2017

(87) PCT Pub. No.: WO2016/084805
PCT Pub. Date: Jun. 2, 2016

(65) Prior Publication Data
US 2017/0298662 A1    Oct. 19, 2017

(30) Foreign Application Priority Data
Nov. 28, 2014  (JP) .................................. 2014-240916

(51) Int. Cl.
*E05B 81/90* (2014.01)
*E05B 83/40* (2014.01)
(Continued)

(52) U.S. Cl.
CPC .............. *E05B 81/90* (2013.01); *E05B 79/20* (2013.01); *E05B 81/06* (2013.01); *E05B 81/14* (2013.01);
(Continued)

(58) Field of Classification Search
CPC ........... Y10T 292/108; Y10T 292/1082; Y10T 292/1092; Y10T 292/1047; E05B 81/90;
(Continued)

(56) References Cited

U.S. PATENT DOCUMENTS

| 5,876,074 | A | * | 3/1999 | Dowling | ................. | E05B 81/20 |
| | | | | | | 292/201 |
| 6,079,757 | A | * | 6/2000 | Aubry | ..................... | E05B 77/28 |
| | | | | | | 292/201 |
| 6,116,664 | A | * | 9/2000 | Wegner | ................... | E05B 81/66 |
| | | | | | | 292/201 |
| 6,637,783 | B2 | * | 10/2003 | Takamura | ............... | E05B 81/14 |
| | | | | | | 292/201 |

(Continued)

FOREIGN PATENT DOCUMENTS

| JP | 2011-80251 A | 4/2011 |
| JP | 2012-67567 A | 4/2012 |

OTHER PUBLICATIONS

International Search Report dated Feb. 16, 2016, in PCT/JP2015/082938 filed Nov. 24, 2015.

*Primary Examiner* — Carlos Lugo
*Assistant Examiner* — Faria F Ahmad
(74) *Attorney, Agent, or Firm* — Oblon, McClelland, Maier & Neustadt, L.L.P.

(57) ABSTRACT

A vehicle door operation device mounted to a sliding door of a vehicle, for appropriately returning a latch mechanism from a closure retention release state to a closure retention state of the sliding door when a motor power transmission lever stops at a rotary range between an initial position to a rotary end position by, for example, an electrical failure when a release motor is in operation includes a cancellation mechanism that moves a connection pin from a connection position where the connection pin connects an outside handle lever and the motor power transmission lever to a disconnection position by using a rotary movement of an inside handle lever in accordance with a closing operation of an inside handle when the motor power transmission lever (Continued)

stops at the rotary range between the initial position to the rotary end position when the release motor is in operation.

5 Claims, 13 Drawing Sheets

(51) Int. Cl.
*E05B 81/14* (2014.01)
*E05B 81/20* (2014.01)
*E05B 79/20* (2014.01)
*E05B 81/06* (2014.01)
*E05B 81/16* (2014.01)
*B60J 5/06* (2006.01)

(52) U.S. Cl.
CPC .............. *E05B 81/16* (2013.01); *E05B 81/20* (2013.01); *E05B 83/40* (2013.01); *B60J 5/06* (2013.01); *Y10T 292/108* (2015.04); *Y10T 292/1047* (2015.04); *Y10T 292/1082* (2015.04); *Y10T 292/1092* (2015.04)

(58) Field of Classification Search
CPC .......... E05B 79/20; E05B 81/06; E05B 81/14; E05B 81/16; B60J 5/06
USPC ....................................................... 77/26, 28
See application file for complete search history.

(56) References Cited

U.S. PATENT DOCUMENTS

| | | | |
|---|---|---|---|
| 8,146,965 B2* | 4/2012 | Akizuki | E05B 81/06 292/201 |
| 8,522,583 B2* | 9/2013 | Cumbo | E05B 81/06 292/201 |
| 8,678,452 B2* | 3/2014 | Nagaoka | E05B 77/265 292/201 |
| 8,827,328 B2* | 9/2014 | Akizuki | E05B 81/06 292/201 |
| 8,919,827 B2* | 12/2014 | Akizuki | E05B 81/06 292/201 |
| 9,428,942 B2* | 8/2016 | Kim | E02F 9/0891 |
| 2002/0171250 A1* | 11/2002 | Kobayashi | E05B 77/30 292/216 |
| 2008/0105011 A1* | 5/2008 | Machida | E05B 81/20 70/237 |
| 2009/0051173 A1* | 2/2009 | Akizuki | E05B 77/26 292/216 |
| 2010/0026014 A1 | 2/2010 | Machida et al. | |
| 2010/0327609 A1* | 12/2010 | Akizuki | E05B 81/06 292/85 |
| 2011/0162419 A1* | 7/2011 | Akizuki | E05B 77/28 70/141 |
| 2013/0000363 A1* | 1/2013 | Akizuki | E05B 77/265 70/101 |
| 2014/0001771 A1 | 1/2014 | Shibayama et al. | |
| 2014/0203572 A1* | 7/2014 | Barmscheidt | E05B 77/28 292/200 |

* cited by examiner

VEHICLE DOOR OPERATION DEVICE

TECHNICAL FIELD

This invention relates to a vehicle door operation device mounted to a sliding door of a vehicle.

BACKGROUND ART

Patent document 1 described below discloses an example of a vehicle door operation device of this kind (a vehicle door operation device). The vehicle door operation device is mounted to a sliding door, and is configured to be able to release a door latch of a latch mechanism for the sliding door (a closure retention of the sliding door) by using a power of a release motor. In particular, the vehicle door operation device includes an open lever (a ratchet interlock lever), an outside handle lever (a vehicle exterior handle interlock lever), a motor power transmission lever, and a cancellation mechanism. The open lever operates the latch mechanism. The outside handle lever interlocks with the open lever. The motor power transmission lever operates by the release motor. The cancellation mechanism deals with, for example, an electrical failure of the release motor. In a case where the latch mechanism maintains to release the closure retention of the sliding door because the motor power transmission lever is retained at a rotary end position due to, for example, the electrical failure of the release motor when the motor power transmission lever is disposed at the rotary end position, the cancellation mechanism cancels this state. For this purpose, the cancellation mechanism is configured to move a connection member, connecting the motor power transmission lever and the outside handle lever so as to be able to transmit the power to each other, from a power transmission position to a power disconnection position via an inside handle lever (a vehicle interior handle interlock lever) operating by a closing operation of an inside handle. According to the cancellation mechanism, the outside handle lever can integrally rotate with the open lever by being disconnected from the motor power transmission lever and perform the closure retention of the sliding door by the latch mechanism by returning the open lever to an initial position.

DOCUMENT OF PRIOR ART

Patent Document

Patent document 1: JP2012-67567A

OVERVIEW OF INVENTION

Problem to be Solved by Invention

Meanwhile, the above-described cancellation mechanism is effective only when the motor power transmission lever is disposed at the rotary end position. Accordingly, the cancellation mechanism cannot operate appropriately when the motor power transmission lever is disposed at any rotary range between the initial position and the rotary end position, and cannot comply with a requirement in which the outside handle lever is desired to be disconnected securely from the motor power transmission lever at the rotary range to return the open lever to the initial position.

The present invention is provided by taking the aforementioned problem into consideration, and one of the objectives is, according to the vehicle door operation device mounted to the sliding door of the vehicle, to provide an effective technology for appropriately returning the latch mechanism from the closure retention release state of the sliding door to the closure retention state when the motor power transmission lever stops at the rotary range between the initial position and the rotary end position due to, for example, the electrical failure when the release motor operates.

Means for Solving Problem

To achieve the aforementioned objectives, a vehicle door operation device according to the present invention includes an open lever, an inside handle lever, an outside handle lever, a motor power transmission lever, and a cancellation mechanism. The open lever is configured to interlink with a latch mechanism for setting a sliding door in a closure retention state and a closure retention state, the open lever being rotatable about a support shaft between a first position corresponding to the closure retention state and a second position corresponding to the closure retention release state, the open lever being constantly and elastically biased toward the first position by an elastic member. The inside handle lever is configured to be connected to both of an inside handle being provided at a vehicle inner side of the sliding door and the open lever, the inside handle lever rotating the open lever toward the second position by rotating about the support shaft in accordance with an opening operation of the inside handle. The outside handle lever is configured to be connected to both of an outside handle being provided at a vehicle outer side of the sliding door and the open lever, the outside handle lever rotating the open lever toward the second position by rotating about the support shaft in accordance with an opening operation of the outside handle. The motor power transmission lever is connected to the outside handle lever via a connection member so as to rotate the open lever toward the second position by receiving a power of a release motor when the release motor is in operation to rotate about the support shaft from an initial position to a rotary end position. The cancellation mechanism moves the connection member from a connection position where the connection member connects the outside handle lever and the motor power transmission lever to a connection release position where the connection member releases the connection between the outside handle lever and the motor power transmission lever by using a rotary movement of the inside handle lever in accordance with a closing operation of the inside handle when the motor power transmission lever stops at a rotary range between the initial position and the rotary end position when the release motor is in operation, that is, when a failure relating to the release motor occurs.

According to the vehicle door operation device of the aforementioned construction, the cancellation mechanism may release the outside handle lever from the motor power transmission lever by releasing the connection between the outside handle lever and the motor power transmission lever. Accordingly, even in a state where the motor power transmission lever stops at any rotary range between the initial position and the rotary end position, the open lever along with the outside handle lever may rotate by the elastic biasing force of the elastic member to return to the first position. As a result, the latch mechanism appropriately returns to the closure retention state from the closure retention release state of the sliding door. In this case, passengers of the vehicle may be able to deal with the failure relating to the release motor by only operating the known inside handle without specifically worrying.

According to the vehicle door operation device of the aforementioned construction, it is favorable that the cancellation mechanism includes a first lever portion, a cancellation lever, a second lever portion, a connection pin and an elastic connection member. The first lever portion corresponds to a portion in which an elongated first guide hole is provided to penetrate the motor power transmission lever. The cancellation lever is rotatably supported by a cancellation lever support shaft provided at a position of the inside handle lever, the position being away from the support shaft. The second lever portion in which an elongated second guide hole extending in a direction orthogonal to an extending direction of the first guide hole is provided to penetrate the cancellation lever. The connection pin serving as the connection member includes a sliding shaft portion slidable both on the first guide hole of the first lever portion and the second guide hole of the second lever portion, and a retention shaft portion being retained at a recessed portion of the motor power transmission lever at the connection position, the retention shaft portion disengaging from the recessed portion at the connection release position. The elastic connection member elastically connects the connection pin and the motor power transmission lever such that the connection pin is retained by the recessed portion at the connection position. Here, in a process in which the inside handle lever rotates in accordance with the closing operation of the inside handle, it is favorable that the second lever portion of the cancellation lever disengages the retention shaft portion of the connection pin from the recessed portion while sliding the sliding shaft portion of the connection pin on the first guide hole of the first lever portion by pressing the sliding shaft portion at one end portion of opposing end portions of the second guide hole against an elastic biasing force of the elastic connection member.

According to the cancellation mechanism, the inside handle lever may be rotatable relative to the motor power transmission lever by the closing operation of the inside handle until the second lever portion of the cancellation lever comes in contact with the connection pin at the one end portion of the second guide hole. In this case, the second guide hole slides relative to the sliding shaft portion of the connection pin. Thus, in an initial stage of the closing operation of the inside handle, the connection pin may establish a slidable state, so called an idling state, almost without being applied with a load relative to the second guide hole. As a result, an operation feeling of the inside handle at the initial state is not deteriorated. Meanwhile, when the one end portion of the second guide hole comes in contact with the sliding shaft portion of the connection pin, the sliding shaft portion is retained in the guide hole to be biased in the extending direction of the second guide hole. An element of the biasing force in the extending direction of the second guide hole is used for disengaging the retention shaft portion of the connection pin from the recessed portion. In the cancellation mechanism, because the operational amount of the closing operation of the inside handle, that is, the rotary amount of the inside handle lever changes in accordance with the stop position of the motor power transmission lever, the retention shaft portion of the connection pin may securely disengage from the recessed portion even in a case where the motor power transmission lever stops at any position. In addition, the cancellation mechanism for releasing the connection between the outside handle lever and the motor power transmission lever may be constructed with a simple structure, that is, the connection pin.

According to the vehicle door operation device of the aforementioned construction, it is favorable that the first guide hole of the first lever portion extends along a normal line direction relative to a virtual circle formed in a case where the motor power transmission lever rotates. In this case, the proportion of the rotary amount of the inside handle lever and the sliding amount of the sliding shaft portion of the connection pin relative to the first guide hole may be constantly maintained in a state where the one end portion of the second guide hole comes in contact with the sliding shaft portion of the connection pin regardless of the stop position of the motor power transmission lever.

According to the vehicle door operation device of the aforementioned construction, it is favorable that the first lever portion and the second lever portion are configured such that an angle established by a direction vector relating to a pressing direction in which the sliding shaft portion of the connection pin is pressed at the one end portion of the second guide hole and by a direction vector relating to a moving direction in which the sliding shaft portion of the connection pin moves while sliding on the first guide hole by being pressed at the one end portion of the second guide hole is an acute angle. Accordingly, when the inside handle lever rotates until the one end portion of the second guide hole comes in contact with the sliding shaft portion of the connection pin after the motor power transmission lever stops, the loss of the rotary amount of the inside handle lever (the operation amount of the inside handle) until the one end portion of the second guide hole comes in contact with the sliding shaft portion of the connection pin may be minimized. As a result, the rotary amount of the inside handle lever (the operation amount of the inside handle) required to disengage the retention shaft portion of the connection pin from the recessed portion after the motor power transmission lever stops may be minimized.

According to the vehicle door operation device of the aforementioned construction, it is favorable that the cancellation lever support shaft for the cancellation lever is provided at a lever arm extending so as to be away from a range where the support shaft for the inside handle lever is provided. The support shaft for the inside handle lever corresponds to a support shaft for other levers, and the configuration of surroundings of the support shaft may easily be complicated. Thus, because the cancellation lever support shaft is away from a range where the support shaft for the inside handle lever is provided, the configuration of the cancellation lever support shaft may not easily influence on the configuration of the surroundings of the support shaft for the inside handle lever. As a result, the surroundings of the support shaft for the inside handle lever may be prevented from increasing the device thickness due to the provision of the cancellation support shaft.

According to the vehicle door operation device of the aforementioned construction, it is favorable that the lever arm of the inside handle lever extends longitudinally along a front-rear direction of the vehicle. An effect of an inertia load applied to the inside handle lever when, for example, the vehicle brakes may be decreased. In this case, because other components, for example, a counterweight, do not have to be added as a countermeasure of an inertial load, the number of components may be prevented from increasing.

Effect of the Present Invention

As above, according to the present invention, when stopping at the rotary range between the initial position and the rotary end position by, for example, electrical failure when the release motor is in operation, the motor power transmission lever may appropriately return the latch mechanism from the closure retention release state to the closure retention state of the sliding door.

MODE FOR CARRYING OUT THE INVENTION

Hereinafter, an embodiment of the present invention will be explained with reference to the drawings. In these drawings, a vehicle front direction and a vehicle rear direction are illustrated as an arrow X1 and an arrow X2, respectively. A vehicle left direction and a vehicle right direction are illustrated as an arrow Y1 and an arrow Y2, respectively. A vehicle upper direction and a vehicle lower direction are illustrated as an arrow Z1 and an arrow Z2, respectively. These directions may be applied for a remote control device that is before or after mounted to a vehicle door. Furthermore, in the present specification, a movement of a predetermined element rotating about an axis is simply described as "pivot" or "rotation" regardless of the moving amount of the predetermined element, however, may be described as "oscillation" or "tilt" as required.

Figure 1:
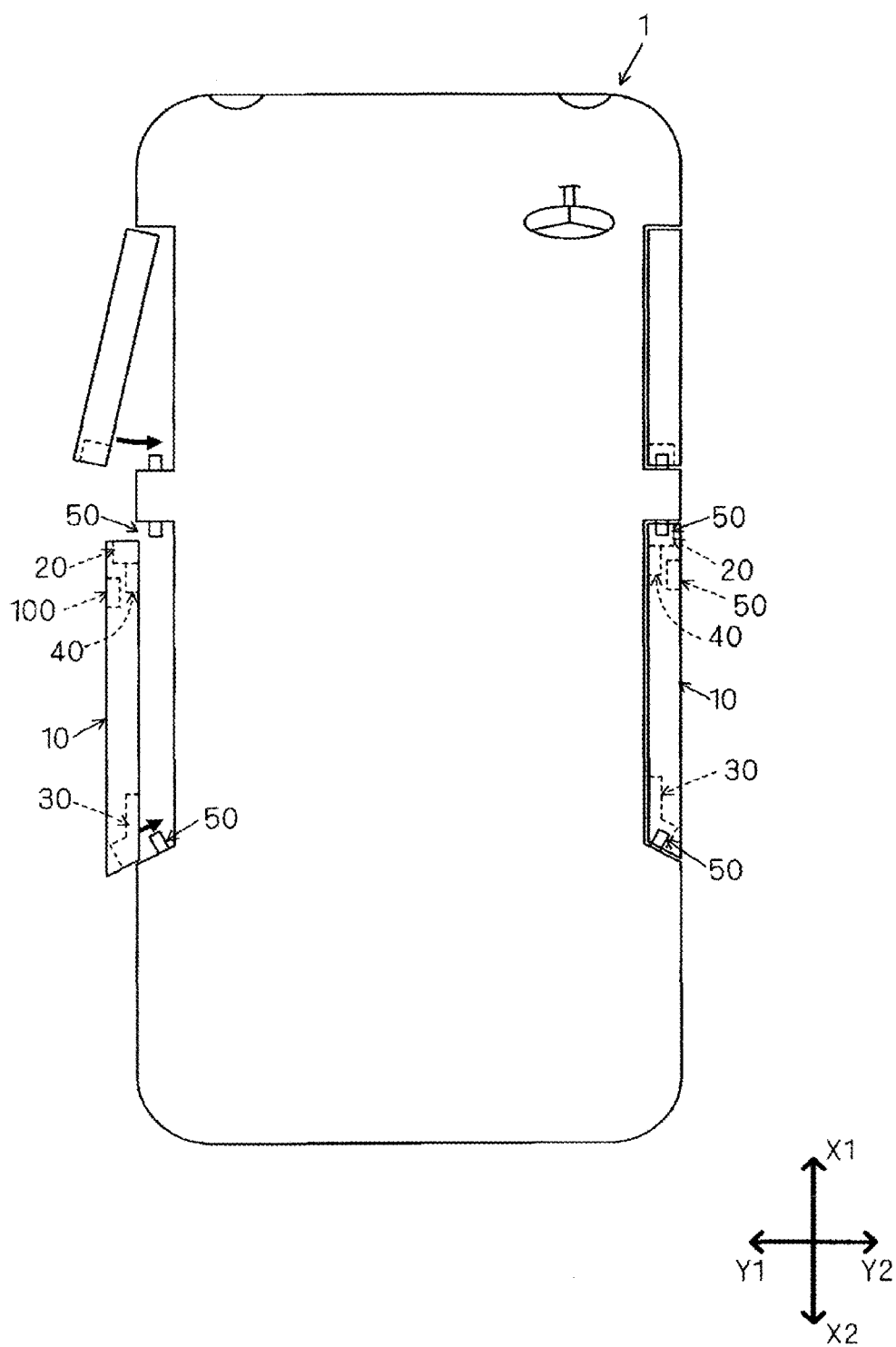
FIG. 1 is a plan view illustrating an overview configuration of a vehicle 1 including a sliding-type vehicle door 10.

A vehicle 1 illustrated in FIG. 1 includes a sliding-type vehicle door 10 (also referred to as a sliding door) provided at a vehicle rear seat. The vehicle door 10 is configured to be movable between a fully-closed state and a fully-open state. The fully-closed state corresponds to a state where the vehicle door 10 completely closes an entrance in which passengers get on and off. The fully-open state corresponds to a state where the vehicle door 10 opens the entrance so as to make an opening area of the entrance to be the maximum. The vehicle door 10 comes to be in the fully-open state by being obliquely pulled back from the fully-closed state, and being straightforwardly pulled back from a way of the oblique pulled-back. Plural elements including a first door lock device 20, a second door lock device 30, a third door lock device 40, and a remote control device 100 are mounted to the vehicle door 10. Strikers 50 supporting the first, second and third door lock devices 20, 30, 40, respectively, are provided at respective door frames of a vehicle main body.

Figure 2:
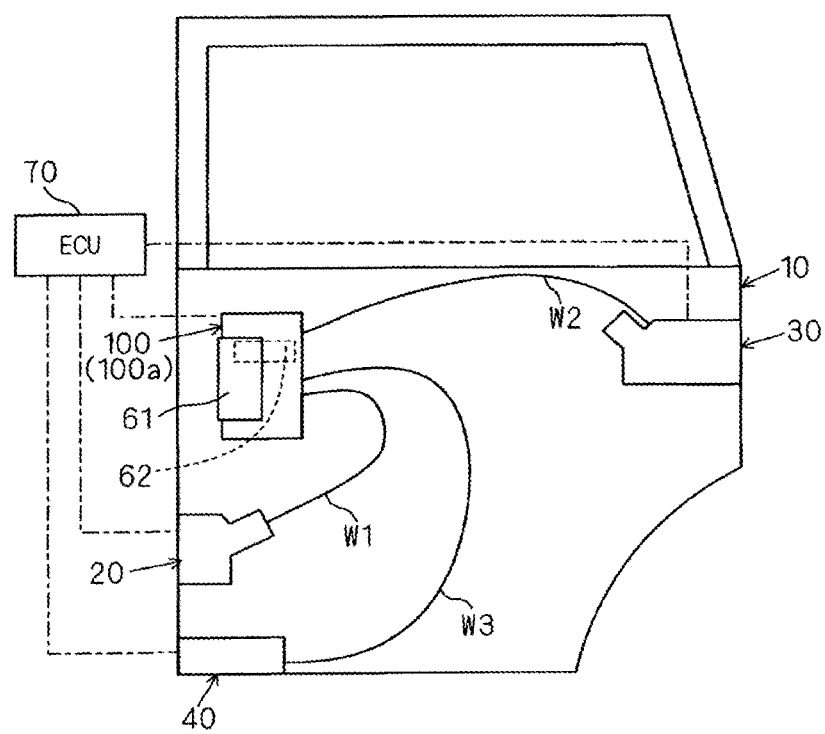
FIG. 2 is a side view illustrating an overview configuration of the vehicle door 10 in FIG. 1.
Figure 2:
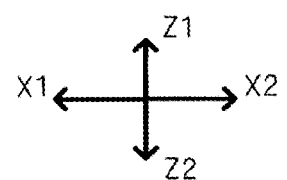

As shown in FIG. 2, each of the first door lock device 20, the second door lock device 30, the third door lock device 40, and the remote control device 100 includes a controlled means, for example an actuator, being controlled by a known an electric control unit 70 (ECU 70) mounted to the vehicle. The ECU 70 is configured with, for example, a signal process circuit, a CPU (a control processing unit), and a memory circuit. The first door lock device 20 performs a function to retain the vehicle door 10 in a closed state. The first door lock device 20 is connected to the remote control device 100 via an open cable W1. The second door lock device 30 performs the function to retain the vehicle door 10 in the closed state. The second door lock device 30 is connected to the remote control device 100 via an open cable W2. The third door lock device 40 performs a function to retain the vehicle door 10 in the fully-open state. The third door lock device 40 is connected to the remote control device 100 by via open cable W3.

The remote control device 100 is assigned with two handles 61, 62 separately provided at a vehicle inside and a vehicle outside of the vehicle door 10, respectively. One handle 61 that is provided at the vehicle inside of the vehicle door 10 corresponds to an inside handle, and the other handle 62 that is provided at the vehicle outside of the vehicle door 10 corresponds to an outside handle. The remote control device 100 includes a handle operation detection sensor 100a for detecting that each of the inside handle and the outside handle opens the door. The remote control device 100 is configured to perform a movement pulling the cables W1, W2, W3 toward the remote control device 100 by operating in connection with the door opening operation of the handle 61, 62 when the vehicle door 10 is in an unlocked state where the opening movement of the vehicle door 10 is not locked. Meanwhile, the remote control device 100 is configured to block the cables W1, W2, W3 from being pulled toward the remote control device 100 by operating in connection with the door opening operation of the handle 61, 62 when the vehicle door 10 is in a locked state where the opening movement of the vehicle door 10 is locked.

Figure 3:
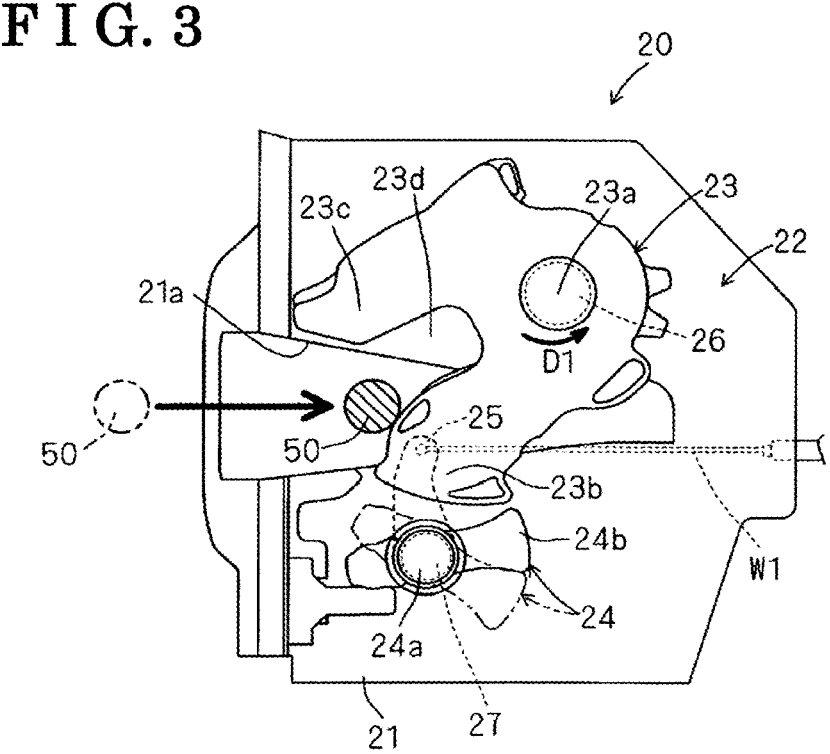
FIG. 3 is a view illustrating a state where a latch 23 is disposed at an unlatched position of a latch mechanism 22 of a first door lock mechanism 20 in FIG. 2.

As shown in FIG. 3, the first door lock device 20 includes a base board 21 and a latch mechanism 22 (also referred to as a latch and pawl mechanism). The base board 21 is formed with a striker receiving groove 21a for receiving a striker 50. The latch mechanism 22 is mounted to the base board 21. The latch mechanism 22 includes a function to set the vehicle door 10 in a closure retention state (a state where the vehicle door 10 is closed and retained) and a closure retention release state (a state where the closure retention state of the vehicle door 10 is released), and includes a latch 23 and a pawl 24.

The latch 23 is rotatably supported by a rotary axis 23a provided at the base board 21, and may rotate in both directions, an engaging direction and a disengaging direction relative to the striker 50. The latch 23 is set at plural positions including an unlatched position, fully-latched position, and a half-latched position between the unlatched position and the fully-latched position. The latch 23 includes a first retaining pawl 23b and a second retaining pawl 23c that extend in substantially parallel to each other. A range where the first and second retaining pawls 23b, 23c face with each other is configured as a striker receiving portion 23d for receiving the striker 50. The latch 23 is elastically biased in a latch release direction (the clockwise direction in FIG. 3) toward the unlatched position by a torsion spring 26 (an elastic coil spring).

The striker 50 entering into the striker receiving groove 21a of the base board 21 when the vehicle door 10 is closed enters into the striker receiving portion 23d while pressing a facing surface of the first retaining pawl 23b of the latch 23, the facing surface provided at a side where the striker receiving portion 23d is provided (see an arrow in FIG. 3). Accordingly, when the vehicle door 10 is closed, the latch 23 engages with the striker 50 from the unlatched position shown in FIG. 3 and rotates in the engaging direction (a direction shown in an arrow D1 in FIG. 3) about the rotary axis 23a. That is, the latch 23 rotates in a lock direction where the latch 23 is locked by deeply engaging with the striker 50.

The pawl 24 is rotatably supported by a rotary axis 24a provided at the base board 21, and extends toward the latch 23. In this case, the rotary axis 24a of the pawl 24 extends in the same direction as an extending direction of the rotary axis 23a of the latch 23. The pawl 24 is configured to be able to rotate between a restriction position where the pawl 24 restricts the striker 50 from rotating in a direction disengaging from the latch 23, and a non-restriction position where the pawl 24 does not restrict the striker 50 from rotating in the direction disengaging from the latch 23. A pawl operation lever 25 is integrally mounted to the rotary axis 24a of the pawl 24. The pawl operation lever 25 is elastically biased toward the initial position by a torsion spring 27 (an elastic coil spring), and is connected to the remote control device 100 via the open cable W1. As a result, the pawl 24 is elastically biased in the anticlockwise direction about the rotary axis 24a by the torsion spring 27, and rotates in the clockwise direction against the elastic biasing force of the torsion spring 27 when the open cable W1 is pulled toward the remote control device 100. Accordingly, the pawl 24 is operated from the restriction position (also referred to as the initial position) shown in a solid line in FIG. 3 to the non-restriction position (also referred to as the release position) shown in a two-dot chain line in FIG. 3. When the pawl 24 is disposed at the restriction position, the latch 23 is restricted from rotating in the disengaging direction by an engagement piece 24b. When the pawl 24 is disposed at the non-restriction position, the latch 23 is not restricted from rotating in the disengaging direction.

Figure 4:
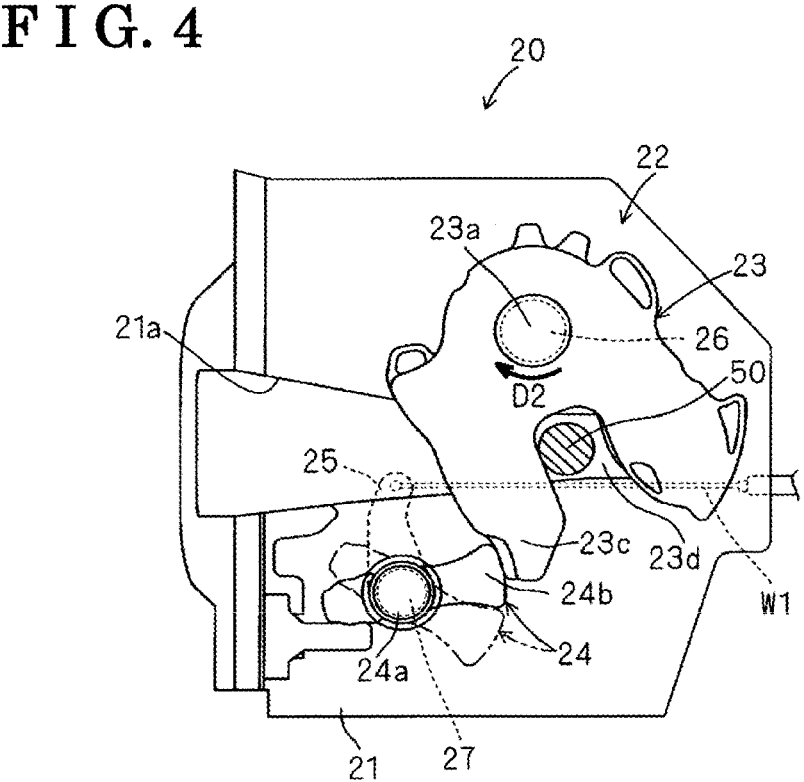
FIG. 4 is a view illustrating a state where the latch 23 is disposed at a fully-latched position of the latch mechanism 22 of the first door lock mechanism 20 in FIG. 2.

When the latch 23 is set from the unlatched position shown in FIG. 3 to the fully-latched position shown in FIG. 4 by rotating about the rotary axis 23a in the clockwise direction, the latch 23 is restricted from rotating in the clockwise direction (a direction shown in an arrow D2 in FIG. 4) about the rotary axis 23a by being positioned in the fully-latched position because the second engagement pawl 23c of the latch 23 and the engagement piece 24b of the pawl 24 that is disposed at the restriction position come in contact with each other. That is, the latch 23 is restricted from rotating in the unlock direction (the unlatched direction) at the fully-latched position. As a result, the vehicle door 10 is retained in the fully-closed state.

Figure 5:
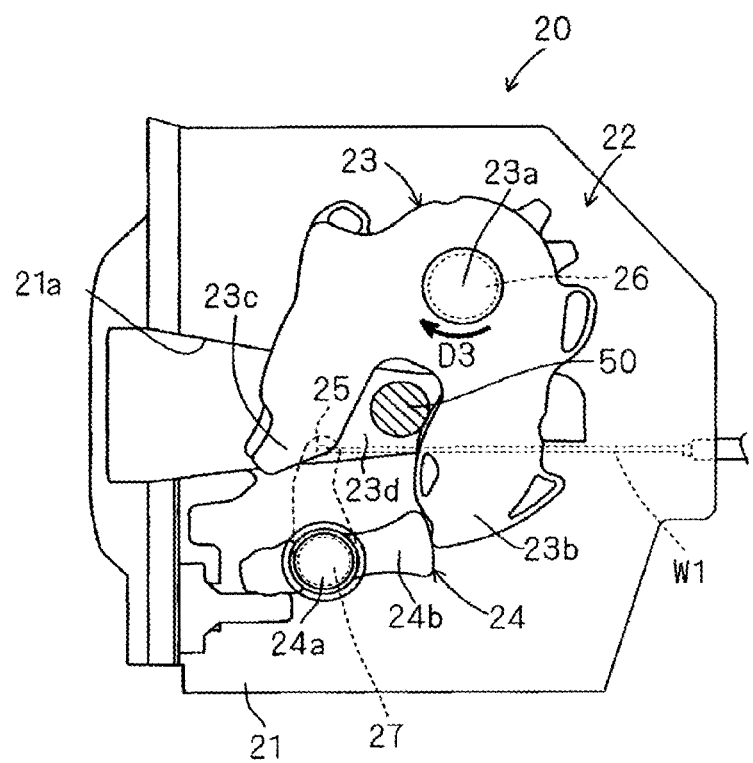
FIG. 5 is a view illustrating a state where the latch 23 is disposed at a half-latched position of the latch mechanism 22 of the first door lock mechanism 20 in FIG. 2.

On the other hand, when the latch 23 is retained at a position before reaching the fully-latched position shown in FIG. 4, that is, the half-latched position shown in FIG. 5, the latch 23 is restricted from rotating in the clockwise direction (a direction shown in an arrow D3 in FIG. 5) about the rotary axis 23a by being positioned at the half-latched position by the engagement piece 24b of the pawl 24 that is disposed at the restriction position. That is, the latch 23 is restricted from rotating in the unlock direction (the unlatched direction) at the half-latched position. As a result, the vehicle door 10 is retained at a state before coming into a fully-closed state, that is, a half-open state of the vehicle door 10.

According to the first door lock device 20, in a state where the latch 23 is set at the fully-latched position shown in FIG. 4 and engages with the striker 50 when the vehicle door 10 is in the closed state, the open cable W1 is pulled toward the remote control device 100 when the inside handle 61 or the outside handle 62 performs opening operation relative to the vehicle door 10. At this time, because the pawl 24 is set at the non-restriction position, shown in the two-dot line, by rotating in the clockwise direction, the pawl 24 releases the rotation restriction of the latch 23.

Meanwhile, although detailed explanation will be omitted, each of the second door lock device 30 and the third door lock device 40 includes a latch mechanism that is the same or substantially the same as the latch mechanism 22 of the first door lock device 20. According to the second door lock device 30, when the inside handle 61 or the outside handle 62 performs the opening operation relative to the vehicle door 10 that is in the fully-opened state, the open cable W2 is pulled toward the remote control device 100 to release the rotation restriction of the latch by the pawl. According to the third door lock device 40, when the inside handle 61 or the outside handle 62 performs the opening operation relative to the vehicle door 10 that is in the fully-opened state, the open cable W3 is pulled toward the remote control device 100 to release the rotation restriction of the latch by the pawl. Regarding further detained structures of the second door lock device 30 and the third door lock device 40, structures of a fully-open door lock device 10C and a rear door lock device 10B disclosed in JP2012-67567A are referred.

When the latch of the first door lock device 20 and the latch of the second door lock device 20 engage with the strikers 50, respectively, the vehicle door 10 is retained in the closed state by a collaboration of the both latches. Meanwhile, when the rotation restriction of the latches of the first door lock device 20 and the second door lock device 30 by the pawls is released, the vehicle door 10 moves to an openable state by the collaboration of the latches that release (the release of the door latches) the retention of the closing state of the vehicle door 10. In addition, even though not having the drawings specifically, the vehicle door 10 is assigned with an electric door opening/closing device (a power sliding door device) that can electrically open and close the vehicle door 10. The vehicle door 10 is configured to electrically open by the electric door opening/closing device that operates in connection with the door latch release of the first door lock device 20 and the second door lock device 30. On the other hand, the vehicle door 10 is configured to be electrically closed by the electric door opening/closing device that operates in connection with the door latch release of the third door lock device 40.

Figure 6:
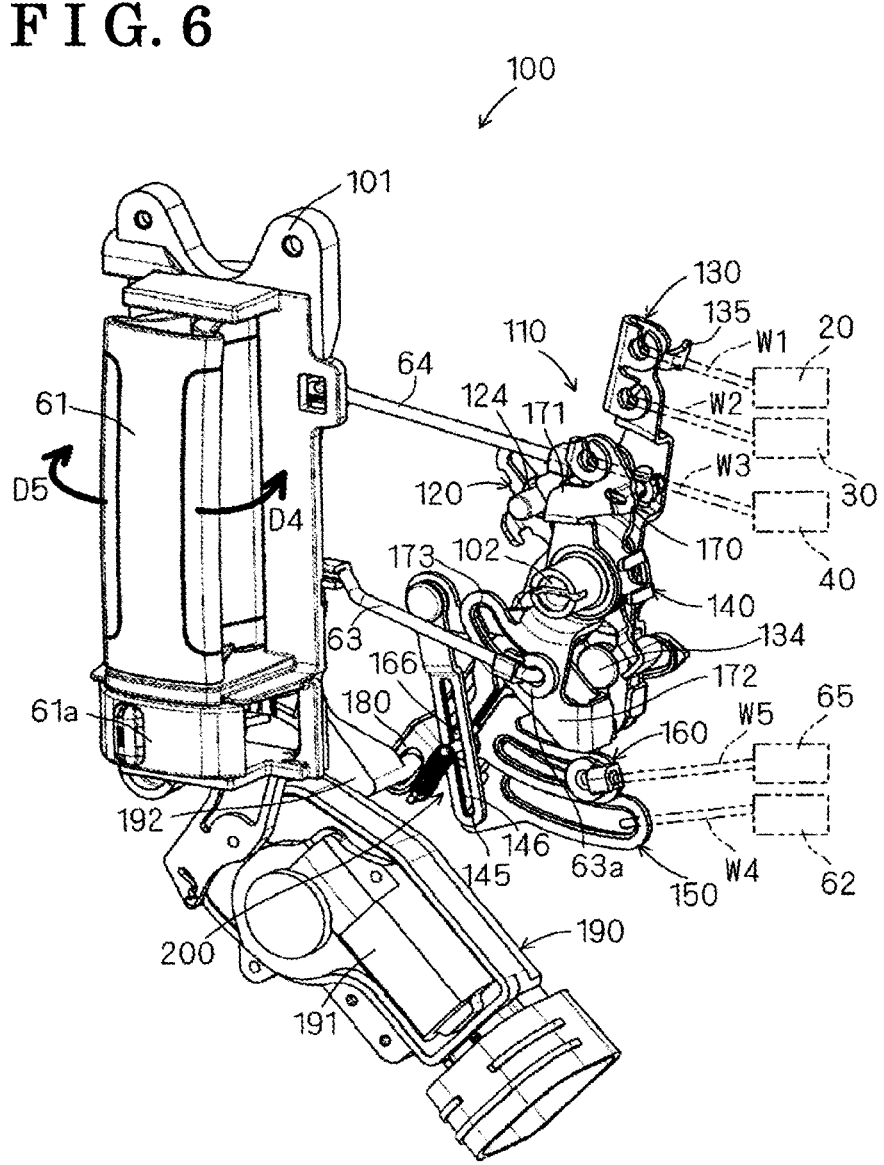
FIG. 6 is a perspective view of a remote control device 100 in FIG. 2.

Here, a detailed structure of the remote control device 100 will be explained with reference to FIGS. 6 to 10. As shown in FIG. 6, the base board 101 of the remote control device 100 is provided with an inside handle 61, a lock operation portion 61*a* and a vehicle door operation device 110. In FIG. 6, only a part of the base board 101 is illustrated to clarify the structure of the vehicle door operation device 110. In the explanation of the vehicle door operation device 110 described hereunder, the clockwise direction in FIGS. 6 and 7, and the anticlockwise direction in FIG. 8 correspond to a first rotary direction D6, and the anticlockwise direction in FIGS. 6 and 7, and the clockwise direction in FIG. 8 correspond to a second rotary direction D7.

The inside handle 61 corresponds to an elongated member extending along the vehicle upper-lower direction Z1 and Z2 so as to be exposed inside the vehicle. The inside handle 61 is set at an initial position in FIG. 6 by an elastic biasing force of a torsion spring (not illustrated). The inside handle 61 that is disposed at the initial position may rotate either in an opening direction D4 for opening operation opening the vehicle door 10 or in a closing direction D5 for closing operation closing the vehicle door 10 by the vehicle door 10 that is manually operated from inside the vehicle. The lock operation portion 61*a* is configured to be set either in an unlock state or in a lock state by the vehicle door 10 that is manually operated from inside the vehicle. The unlock state corresponds to a state where the vehicle door 10 may open by an opening operation of the inside handle 61 and the outside handle 62. The lock state corresponds to a state where the vehicle door 10 may not open by the opening operation of the inside handle 61 and the outside handle 62.

The vehicle door operation device 110 includes plural lever elements that are a pin engagement lever 120, an open lever 130, an inside handle lever 140, an outside handle lever 150, a motor power transmission lever 160, and a fully-opening lock lever 170. Each of the plural lever elements corresponds to metal-made plate members extending along a flat surface being defined by the vehicle front-rear direction X1, X2 and the vehicle upper-lower direction Z1, Z2. The plural lever elements are rotatably supported by a common support shaft 102 provided on the base board 101. According to the lever elements, the pin engagement lever 120, the open lever 130, the outside handle lever 150, the motor power transmission lever 160, the inside handle lever 140 and the fully-opening lock lever 170 are disposed in the aforementioned order from the side close to the base board 101 in a plate thickness direction of the base board 101 (the vehicle right-left direction Y1, Y2).

The fully-opening lock lever 170 includes a first lever arm 171 and a second lever arm 172. The first lever arm 171 is connected to a pawl (not illustrated) of the third door lock device 40 via the open cable W3. The second lever arm 172 includes an engagement hole 173 that is provided to penetrate the second lever arm 172 and that extends in a rotary circumference direction of the fully-opening lock lever 170 to be formed in an arc shape. The fully-opening lock lever 170 is connected to the base board 101 via a torsion spring (not illustrated) that elastically biases the fully-opening lock lever 170 in the first rotary direction D6 about a support shaft 102. A connection rod 63 extending from the inside handle 61 is slidably supported by the engagement hole 173 of the second lever arm 172 at a slide bush 63*a* provided at a distal end portion of the connection rod 63. Thus, when the inside handle 61 rotates in the closing direction D5 by the closing operation of the inside handle 61, the fully-opening lock lever 170 is pressed by the connection rod 63 and rotates in the second rotary direction (the anticlockwise direction in FIG. 6) about the support shaft 102 against the elastic biasing force of a torsion spring (not illustrated). At this time, because the open cable W3 that is connected to the first lever arm 171 of the fully-opening lock lever 170 is pulled toward the remote control device 100, the rotary restriction of the latch is released by the pawl of the third door lock device 40. Accordingly, the vehicle door 10 that is in the fully-open state may be closed.

Figure 7:
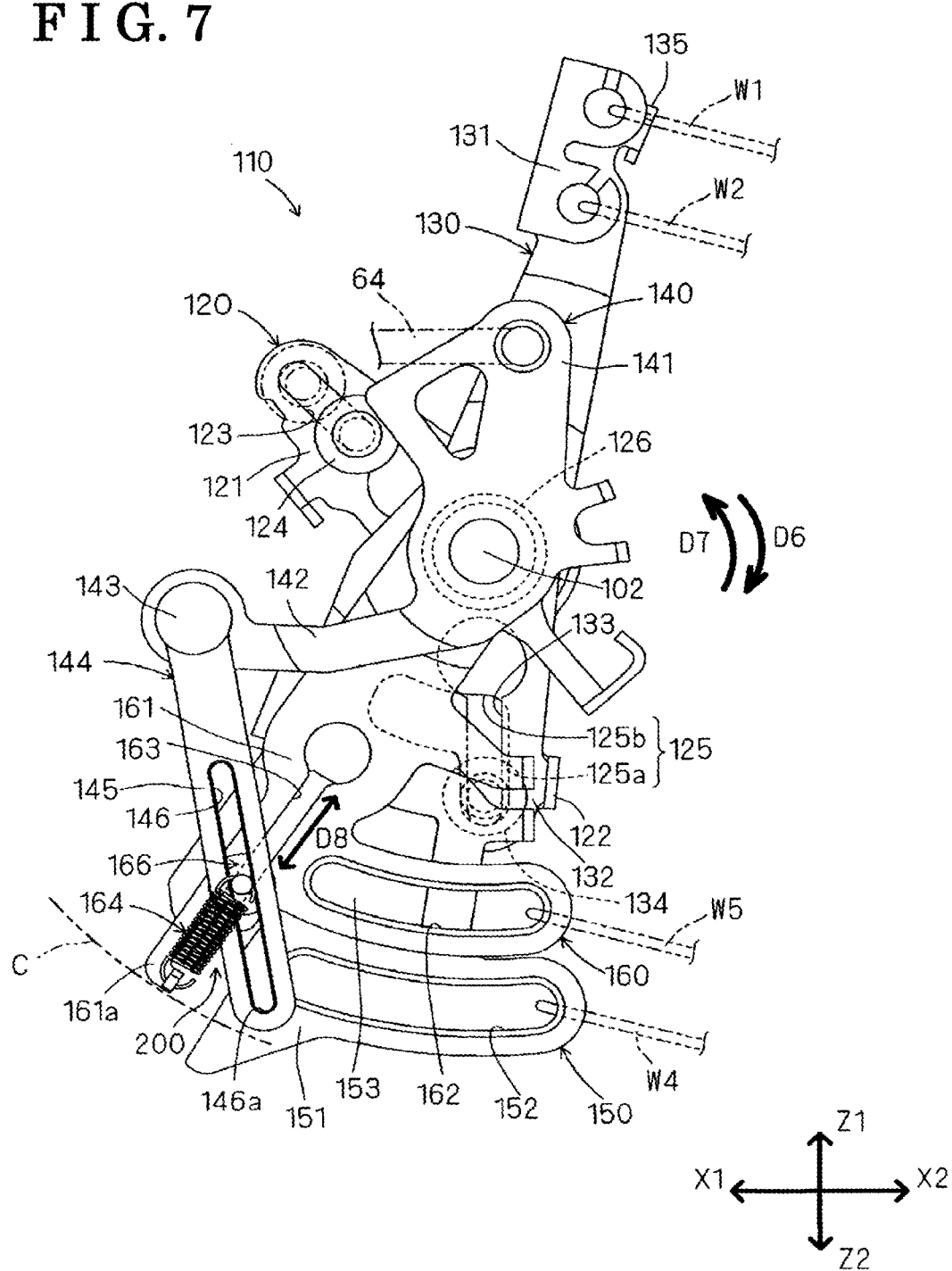
FIG. 7 is a side view of a state, seen from inside of the vehicle, where a vehicle door operation device 220 of the remote control device 100 is in an initial state.

As referred to FIGS. 6 and 7, the inside handle lever 140 includes a first lever arm 141 and a second lever arm 142, and is disposed so as to be overlapped relative to the fully-opening lock lever 170 in FIG. 6 in the vehicle right direction Y2. The first lever arm 141 of the inside handle lever 140 is connected to a distal end portion of the connection rod 64 extending from the inside handle 61. Accordingly, when the inside handle 61 rotates in the opening direction D4 by the opening operation of the inside handle 61, the inside handle lever 140 is pulled toward the inside handle 61 by the connection rod 64, and rotates about the support shaft 102 in the second rotary direction D7. Meanwhile, when the inside handle 61 rotates in the closing direction D5 by the closing operation of the inside handle 61, the inside handle lever 140 is pressed by the connection rod 64 and rotates about the support shaft 102 in the first rotary direction D6. The inside handle lever 140 is connected to both of the inside handle 61 and the open lever 130, and includes a function to rotate the open lever 130 toward a position supporting a closure retention release state of the latch mechanism 22 by rotating about the support shaft 102 in response to the opening operation of the inside handle 61. The inside handle lever 140 corresponds to an inside handle lever of the present invention.

The inside handle lever 140 includes an elongated cancellation lever 144 that is rotatably supported by a cancellation lever support shaft 143 provided at a position of the second lever arm 142, the position being away from the support shaft 102. The cancellation lever 144 corresponds to a cancellation lever of the present invention. The cancellation lever 144 is provided with a lever portion 145 having a guide hole 146 being provided to penetrate and extending linearly in an longitudinally extending direction. The guide hole 146 of the lever portion 145 is configured to engage with a connection pin 166 which will be described later. The guide hole 146 of the lever portion 145 is configured as an elongated long hole extending in a direction orthogonal to an extending direction of a guide hole 163 provided at the motor power transmission lever 160, the guide hole 163 which will be described later. The lever portion 145 and the guide hole 146 described here correspond to a second lever portion and a second guide hole of the present invention, respectively.

It is favorable that the cancellation lever support shaft 143 for the cancellation lever 144 is provided at the second lever arm 142 that extends so as to be away from a range where the support shaft 102 for the inside handle lever 140 is provided. The support shaft 102 for the inside handle lever 140 corresponds to a support shaft for other levers, and the configuration of surroundings of the support shaft 102 may easily be complicated. Thus, because the cancellation lever support shaft 143 is away from a range where the support shaft 102 for the inside handle lever 140 is provided, the configuration of the cancellation lever support shaft 143 may not easily influence on the configuration of the surroundings of the support shaft 102 for the inside handle lever 140. As a result, the surroundings of the support shaft 102 for the inside handle lever 140 may be prevented from increasing the device thickness due to the provision of the cancellation support shaft 143.

It is favorable that the second lever arm 142 of the inside handle lever 140 extends longitudinally along the vehicle front-rear direction X1, X2. An effect of an inertia load applied to the inside handle lever 140 when, for example, the vehicle 1 brakes may be decreased. In this case, because other components, for example, a counterweight, do not have to be added as a countermeasure of an inertial load, the number of components may be prevented from increasing.

The pin engagement lever 120 includes a first lever arm 121 and a second lever arm 122. The pin engagement lever 120 is connected to the base board 101 via a torsion spring (not illustrated) that elastically biases the pin engagement lever 120 in the first rotary direction D6 about the support shaft 102.

An elongated engagement hole (long hole) 123 reciprocatably engaging with a locking pin 124 connected to a child-safety lock operation portion (not illustrated) is provided to penetrate the first lever arm 121 of the pin engagement lever 120. By the operation of the child-safety lock operation portion, the locking pin 124 is movable between a child-safety lock position (a position shown in a two-dotted chain line in FIG. 7) and a child-safety unlock position (a position shown in a solid line in FIG. 7). The locking pin 124 is configured to engage with the inside handle lever 140 when being disposed at the child-safety unlock position. Accordingly, the inside handle lever 140 engages with the pin engagement lever 120 via the locking pin 124 that is disposed at the child-safety unlock position, and is integrally rotatable with the pin engagement lever 120. Accordingly, when the locking pin 124 is disposed at the child-safety unlock position, the rotary force applied by the opening operation of the inside handle 61 may be transmitted from the inside handle lever 140 to the pin engagement lever 120. Meanwhile, when being disposed at the child-safety lock position, the locking pin 124 is configured not to engage with the inside handle lever 140. Accordingly, when the locking pin 124 is disposed at the child-safety lock position, the rotary force applied by the opening operation of the inside handle 61 cannot be transmitted from the inside handle lever 140 to the pin engagement lever 120.

Figure 8:
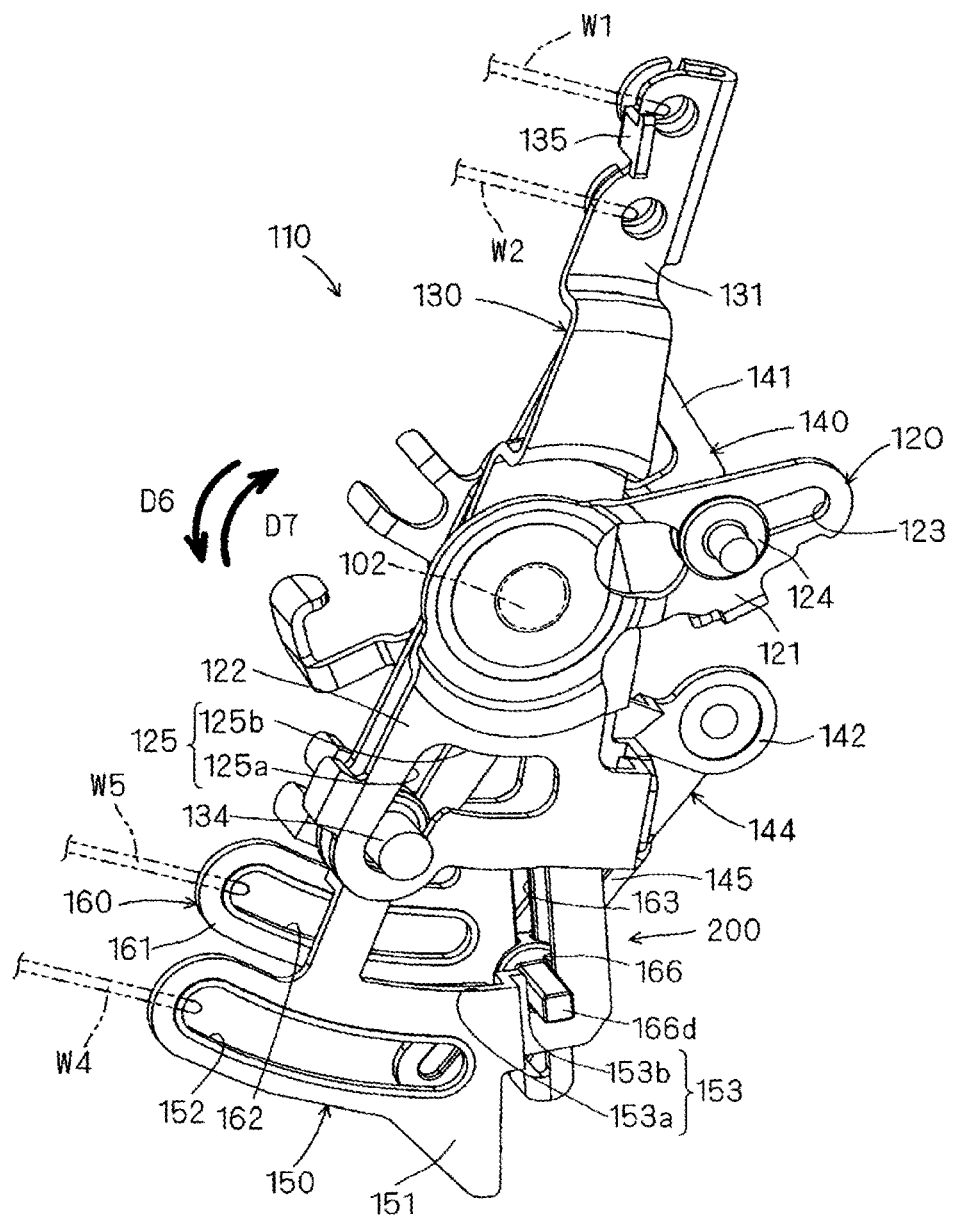
FIG. 8 is a perspective view of a vehicle door operation device 110 in FIG. 7, seen from outside of the vehicle.

As referred to FIGS. 7 and 8, a substantially L-shaped engagement hole 125 reciprocatably engaging with the movable pin 134 is provided to penetrate the second lever arm 12 of the pin engagement lever 120. The engagement hole 125 is configured with a first hole construction portion 125a and a second hole construction portion 125b. The first hole construction portion 125a linearly extends in a rotary radial direction of the pin engagement lever 120. The second hole construction portion 125b extends from one end portion of the first hole construction portion 125a, the one end portion close to the support shaft 102, in a rotary circumferential direction of the pin engagement lever 120 so as to be formed in an arc shape.

The open lever 130 includes a first lever arm 131 and a second lever arm 132. The open cables W1, W2 for connecting the first door lock device 20 and the second door lock device 30 to the pawls, respectively, are mounted to the first lever arm 131. An engagement hole 133 linearly extending in the rotary radial direction of the open lever 130 and engaging with a movable pin 134 that reciprocatably engages with the engagement hole 133 is provided to penetrate the second lever arm 132. In this case, the movable pin 134 is configured as a common engagement member engaging with both the engagement hole 125 of the second lever arm 122 and the engagement hole 133 of the second lever arm 132. The open lever 130 is set at the initial position shown in FIG. 7 such that the second lever arm 132 engages with the second lever arm 122 of the pin engagement lever 120 elastically biased in the first rotary direction D6 by a torsion spring 126, and the rotation in the first rotary direction D6 is restricted by coming in contact with the base board 101 at the stopper portion 135. Thus, the open lever 130 is rotatable about the support shaft 102 between a first position (also referred to as an initial position) supporting the closure retention state of the latch mechanism 22 and a second position supporting the closure retention release state of the latch mechanism 22, and constantly and elastically biased toward the first position by the torsion spring 126 (a member corresponding to an elastic member of the present invention). The open lever 130 corresponds to an open lever in the present invention.

As illustrated in FIG. 6, a locking actuator 190 configured to operate a locking lever 180 engaging with the movable pin 134 is mounted to the base board 101. The locking actuator 190 operates the locking lever 180 to move the movable pin 134 within the engagement hole 133. The locking actuator 190 includes an electric motor 191 and an output lever 192. The electric motor 191 operates by a remote control (an operation of a remote control key or an in-vehicle central door lock button). The output lever 192 is configured to transmit the drive force of the electric motor 191 to the locking lever 180. The output lever 192 is configured to operate by the lock operation and the unlock operation of the lock operation portion 61a. Accordingly, the movable pin 134 is configured to move between an unlock position and a lock position by either the lock and unlock operations of the lock operation portion 61a or the operation of the locking lever 180 by the drive force of the locking actuator 190. The unlock position corresponds to a position of the engagement hole 133 of the open lever 130 that corresponds to the first hole construction portion 125a of the engagement hole 125. The lock position corresponds to a position of the engagement hole 133 of the open lever 130 that corresponds to the second hole construction portion 125b of the engagement hole 125.

For example, when the lock operation portion 61a performs lock operation, the movable pin 134 moves from the unlock position to the lock position via the locking lever 180. Meanwhile, when the lock operation portion 61a performs unlock operation, the movable pin 134 moves from the lock position to the unlock position via the locking lever 180. When the movable pin 134 is set at the unlock position, the open lever 130 and the pin engagement lever 120 are integrally rotatably connected with each other by the movable pin 134. In this case, the power applied by the opening operation of the inside handle 61 is transmitted to the open lever 130 via the inside handle lever 140 and the pin engagement lever 120, and the inside handle lever 140, the pin engagement lever 120, and the open lever 130 rotate in the second rotary direction D7. On the other hand, when the movable pin 134 is set at the lock position, the movable pin 134 comes to be movable at the second hole construction portion 125b of the engagement hole 125, thereby the open lever 130 and the pin engagement lever 120 come to be relatively rotatable. In this case, the power applied by the opening operation of the inside handle 61 is not transmitted to the open lever 130.

As referred to FIGS. 7 and 8, the outside handle lever 150 includes a lever portion 151 on which an engagement hole 152 and an engagement opening 153 are provided to penetrate. The engagement hole 152 of the lever portion 151 corresponds to a long hole extending in the rotary circumferential direction of the outside handle lever 150 to be formed in an arc shape. A slide bush (not illustrated) being connected to an end of the open cable W4 extending from the outside handle 62 slidably engages with the engagement hole 152. The engagement opening 153 of the lever portion 151 corresponds to a substantially L-shaped opening portion provided in adjacent to the engagement hole 152. The engagement opening 153 includes a first opening construction portion 153a and a second opening construction portion 153b (also referred to as a recessed portion). The first opening construction portion 153a extends in the rotary circumferential direction of the outside handle lever 150 to be formed in the arc shape. The second opening construction portion 153b linearly extends in the rotary radial direction of the outside handle lever 150 from the first opening construction portion 153a. The second opening construction portion 153b of the outside handle lever 150 is configured to be engageable with the connection pin 166 which will be described below.

The lever portion 151 of the outside handle lever 150 is configured to press the first lever arm 121 of the pin engagement lever 120 and the first lever arm 171 of the fully-opening lock lever 170 when rotating about the support shaft 102 in the second rotary direction D7. Thus, when the outside handle lever 150 rotates about the support shaft 102 in the second rotary direction D7 via the open cable W4 by the opening operation of the outside handle 62, the pin engagement lever 120 and the fully-opening lock lever 170 rotate in the same direction as the rotary direction of the outside handle lever 150. In this case, the power applied by the opening operation of the outside handle 62 is transmitted to the pin engagement lever 120 and the fully-opening lock lever 170 regardless of the lock state or the unlock state of the lock operation portion 61a (the position of the movable pin 134 at the engagement hole 33).

Furthermore, as described above, when the movable pin 134 is set at the unlock position by the locking actuator 190, because the pin engagement lever 120 and the open lever 130 are integrally rotatably connected with each other, the power applied by the opening operation of the outside handle 62 is transmitted from the outside handle 150 to the open lever 130 via the pin engagement lever 120 and the fully-opening lock lever 170. The outside handle lever 150 is connected to both of the outside handle 62 and the open lever 130, and is configured to includes a function to rotate the open lever 130 toward a position supporting the closure retention release state of the latch mechanism 22 by rotating about the support shaft 102 in accordance with the opening operation of the outside handle 62. The outside handle lever 150 corresponds to an outside handle lever of the present invention.

The motor power transmission lever 160 includes a lever portion 161 on which an engagement hole 162 and a guide hole 162 are provided to penetrate. The engagement hole 162 of the lever portion 161 corresponds to a long hole extending in the rotary circumferential direction of the motor power transmission lever 160 to be formed in the arc shape. A slide bush (not illustrated) being connected to an end of the open cable W5 extending from the release motor 65 slidably engages with the engagement hole 162. Accordingly, when the open cable W5 is pulled toward the release motor 65 by the operation of the release motor 65, the motor power transmission lever 160 rotates about the support shaft 102 in the second rotary direction D7. The motor power transmission lever 160 includes a function to rotate the open lever 130 toward a position supporting the closure retention release state of the larch mechanism 22 by rotating about the support shaft 102 in the second rotary direction D from the initial position illustrated in FIG. 7 by receiving the power of the release motor 65 when operating. The motor drive force transmission lever 160 corresponds to a motor power transmission lever of the present invention.

The release motor 65 operates when the door latch of the latch mechanism 22 is released by the manual operation of the inside handle 61 or the outside handle 62. For example, the release motor 65 operates under the stipulation that a detection switch (not illustrated) detects that either the fully-opening lock lever 170 or the inside handle lever 140 rotates by a predetermined amount in the second rotary direction D7, and the door latch of the second door lock device 30 is released. Accordingly, the release motor 65 maintains the latch mechanism in the door latch released state until the electric door opening/closing device starts operation (the vehicle door 10 starts the electric sliding operation). The release motor 65 operates to release the door latch under the stipulation that the movable pin 134 is disposed at the unlock position and that the remote control operation (the operation of the remote control key and the in-vehicle door opening/closing button) is performed.

Figure 9:
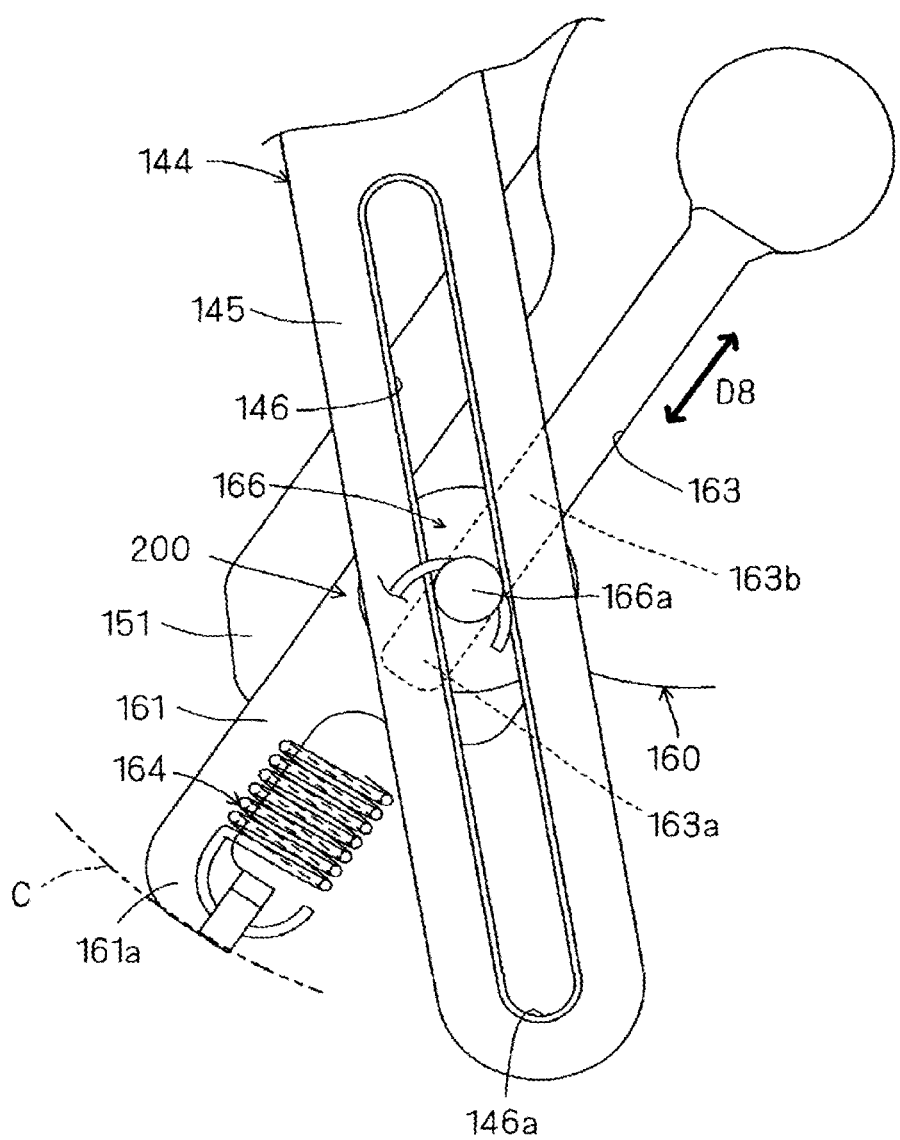
FIG. 9 is a magnified side view perspective view illustrating a peripheral structure of a connection pin 166 in FIG. 7.

As illustrated in FIG. 9, the guide hole 163 of the lever portion 161 corresponds to an elongated long hole linearly extending in the rotary radial direction of the motor power transmission lever 160. As also referred to FIG. 7, the guide hole 163 extends along a normal line direction D8 relative to a virtual circle C formed in a case where the motor power transmission lever 160 rotates. The connection pin 166 reciprocatably engages with the guide hole 163 in the rotary radial direction. The lever portion 161 and the guide hole 163 described here correspond to a first lever portion and a first guide hole, respectively, in the present invention.

Figure 10:
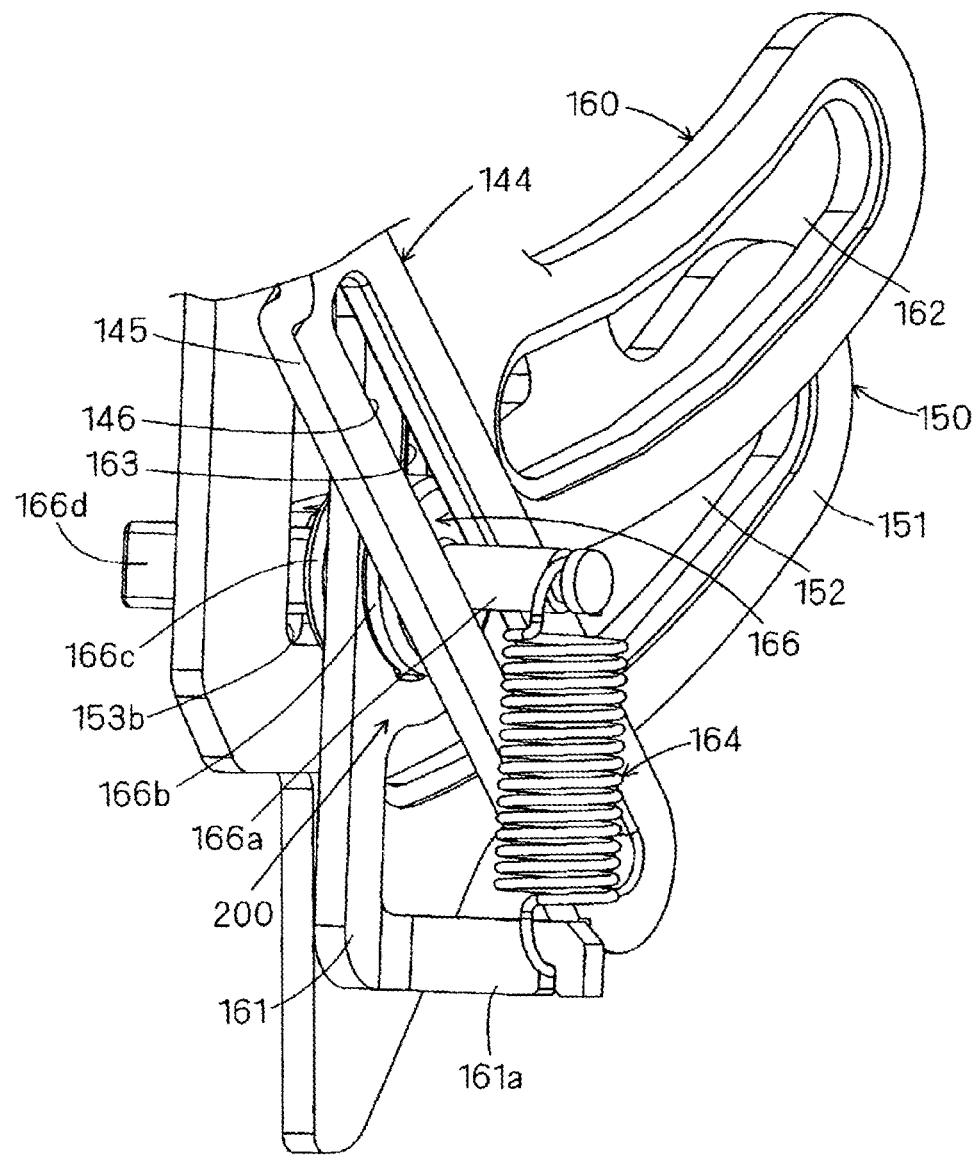
FIG. 10 is another magnified perspective view illustrating the peripheral structure of the connection pin 166 in FIG. 7.

As shown in FIG. 10, the connection pin 166 includes a sliding shaft portion 166a and a retention shaft portion 166d. The sliding shaft portion 166a is slidable both in the guide hole 163 of the lever portion 161 and the guide hole 146 of the lever portion 145. The retention shaft portion 166d is selectively retained by the second opening construction portion 153b of the outside handle lever 150. The sliding shaft portion 166a of the connection pin 166 is retained by the lever portion 161 so as to be slidable at the guide hole 163 such that two flange portions 166b, 166c sandwich the lever portion 161 in a plate thickness direction thereof. The connection pin 166 corresponds to a connection pin and a connection member of the present invention. The sliding shaft portion 166a of the connection pin 166 is connected to a spring retention portion 161a of the lever portion 161 via the torsion spring 164. Accordingly, the connection pin 166 is elastically biased toward a first range 163a (also referred to as a connection position) (see FIG. 9) that corresponds to a distal end of the guide hole 163 by the torsion spring 164. In this case, the torsion spring 164 operates a function to elastically connect the connection pin 166 and the motor power transmission lever 160 such that the retention shaft portion 166d of the connection pin 166 is retained by the second opening construction portion 153b of the outside handle lever 150. The torsion spring 164 corresponds to an elastic connection member of the present invention.

The connection pin 166 is configured such that the retention shaft portion 166d is fitted into the second opening construction portion 153b when the sliding shaft portion 166a is disposed at the first range 163a of the guide hole 163. In this case, the opening width of the second opening construction portion 153b substantially matches the shaft width dimension of the retention shaft portion 166d of the connection pin 166. Accordingly, when the sliding shaft portion 166a of the connection pin 166 is disposed at the first range 163a, the outside handle lever 150 and the motor power transmission lever 160 are integrally rotatably connected with each other by the connection pin 166. Accordingly, the outside handle lever 150 and the motor power transmission lever 160 may transmit the power to each other. On the other hand, when being disposed at the second range 163b (also referred to as a connection release position) in which the sliding shaft portion 166a is displaced toward the support shaft 102 relative to the first range 163a of the guide hole 163 (see FIG. 9), the connection pin 166 is configured such that the retention shaft portion 166d is disposed at the first opening construction portion 153a by being released from the second opening construction portion 153b of the engagement opening 153 of the outside handle lever 150. In this case, the retention shaft portion 166d of the connection pin 166 is movable within the first opening construction portion 153a. Accordingly, when the retention shaft portion 166d of the connection pin 166 is disposed at the second range 163b, the connection between the outside handle lever 150 and the motor power transmission lever 160 by the connection pin 166 is released and the power transmission between the outside handle lever 150 and the motor power transmission lever 160 is disconnected.

The lever portion 161 of the motor power transmission lever 160 is configured to press the first lever arm 171 of the fully-opening lock lever 170 when rotating about the support shaft 102 in the second rotary direction D7. Accordingly, in a case where the motor power transmission lever 160 rotates about the support shaft 102 in the second rotary direction D7 via the open cable W5 by the operation of the release motor 65, the fully-opening lock lever 170 rotates in the same direction as the rotary direction of the motor power transmission lever 160. In this case, the power applied by the release motor 65 is transmitted to the fully-opening lock lever 170 regardless of the lock state or the unlock state of the lock operation portion 61a (the position of the movable pin 134 in the engagement hole 133).

Here, specific movements of the vehicle door operation device 110 when the motor power transmission lever 160 operates will be explained with reference to FIGS. 11 to 13 in addition to FIG. 7.

Figure 11:
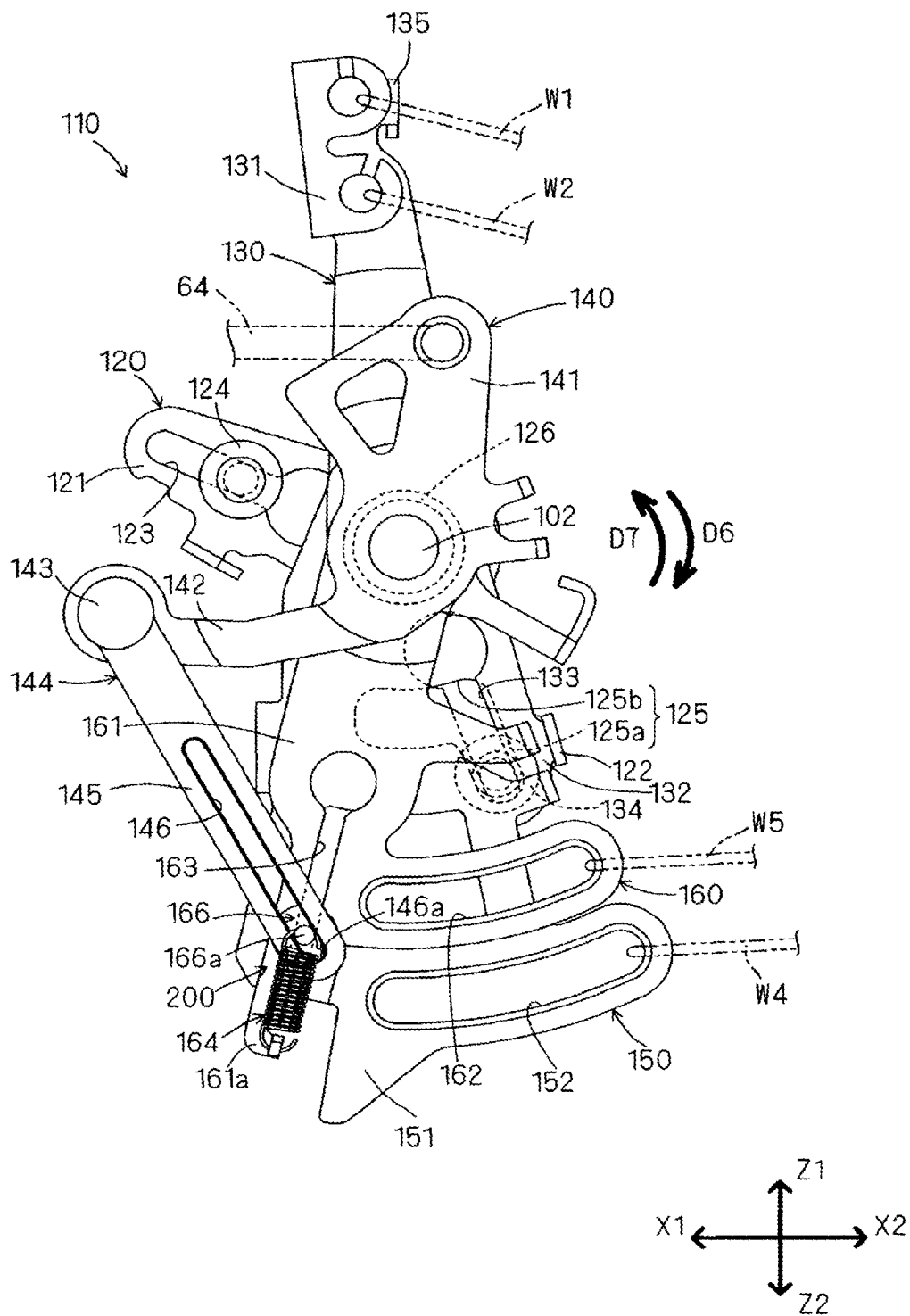
FIG. 11 is a side view illustrating a state where the vehicle door operation device 110 moves from the initial state to a release motor operation state in FIG. 7.

The motor power transmission lever 160 rotates about the support shaft 102 in the second rotary direction D7 from the initial position illustrated in FIG. 7 to the rotary end position illustrated in FIG. 11 by the operation of the release motor 65 in a state where the movable pin 134 is set in the unlock position. At this time, because the connection pin 166 engages with the second opening construction portion 153b of the engagement opening 153 of the outside handle lever 150, the motor power transmission lever 160 rotates in the second rotary direction D7 against the elastic biasing force of the torsion spring 164, and the outside handle lever 150 integrally rotates with the motor power transmission lever 160 in the same direction (the second rotary direction D7). Because the pin engagement lever 120 engages with the outside handle lever 150, and engages with the open lever 130 via the movable pin 134, the open lever 130 integrally rotates with the outside handle lever 150 in the second rotary direction D7 against the elastic biasing force of the torsion spring 126. As a result, the rotation restriction of the latch by the pawl is released at the latch mechanisms 22 of the first door lock device 20 and the second door lock device 30. Meanwhile, the cancellation lever 144 rotates about the cancellation lever support shaft 143 in the second rotary direction D7 until that the connection pin 166 slides to one end portion 146a of the guide hole 146 of the cancellation lever 144.

The motor power transmission lever 160 is retained at the rotary range when being prevented from rotating by a failure relating to the release motor 65 in a state where being disposed at the rotary range (including the rotary end position) between the initial position and the rotary end position. The failure relating to the release motor 65 that is above described includes a physical failure in which, for example, a connection element connected to the release motor 65 is adhered, in addition to an electrical failure of the release motor 65. In this case, because the open lever 130 does not return to the initial position, the rotation restriction of the latch by the pawl is maintained to be released at the latch mechanism 22. That is, the vehicle door 10 cannot be closed appropriately.

Here, the vehicle door operation device 110 of the present embodiment includes a cancellation mechanism 200 that can deal with this kind of circumstance. The cancellation mechanism 200 corresponds to a cancellation mechanism of the present invention. When the motor power transmission lever 160 stops at the rotary range between the initial position and the rotary end position when the release motor 65 operates, the cancellation mechanism 200 moves the connection pin 166 from the connection position to the connection release position by using the rotary operation of the inside handle lever 140 in accordance with the closing operation of the inside handle 61. The connection position corresponds to a position where the outside handle lever 150 and the motor power transmission lever 160 are connected with each other. The connection release position corresponds to a position where the outside handle lever 150 and the motor power transmission lever 160 are disconnected from each other. For this purpose, the cancellation mechanism 200 includes the lever portion 161 of the motor power transmission lever 160, the lever portion 145 of the cancellation lever 144, the connection pin 166, and the torsion spring 164. The lever portion 161 has the guide hole 163. The lever portion 145 includes the guide hole 146.

Effects of the cancellation mechanism 200 will hereunder be specifically explained. When the inside handle 61 performs the closing operation in a state where the motor power transmission lever 160 stops at the rotary range between the initial position and the rotary end position, as illustrated in FIG. 12, the inside handle lever 140 rotates in the first rotary direction D6 from a position shown in a two-dotted chain line in FIG. 12, and the cancellation lever support shaft 143 of the cancellation lever 144 tends to rotate about the support shaft 102 in the first rotary direction D6. In this case, because coming in contact with the one end portion 146a of the guide hole 146 of the cancellation lever 144, the sliding shaft portion 166a of the connection pin 166 is pulled toward the support shaft 102 against the elastic biasing force of the torsion spring 164 by the cancellation lever 144 relative to the rotation of the inside handle lever 140 in the first rotary direction D6. As a result, as illustrated in FIG. 13, the outside handle lever 150 rotates about the support shaft 102 in the first rotary direction D6, and the open lever 130 indirectly connected to the outside handle lever 150 also rotates in the first rotary direction D6 by the elastic biasing force of the torsion spring 126 to return to the initial position illustrated in FIG. 7.

According to the cancellation mechanism 200, in the process where the inside handle lever 140 rotates in accordance with the closing operation of the inside handle 61, the lever portion 145 of the cancellation lever 144 slides in the guide hole 163 of the lever portion 161 by pressing the sliding shaft portion 166a of the connection pin 166 at the one end portion 146a of the both end portions of the guide hole 146 against the elastic biasing force of the torsion spring 164. At the same time, the retention shaft portion 166d of the connection pin 166 may securely disengage from the second opening construction portion 153b of the outside handle lever 150. In this case, when the one end portion 146a of the guide hole 146 comes in contact with the sliding shaft portion 166a of the connection pin 166, the sliding shaft portion 166a is retained in the guide hole 146 to be biased in the extending direction of the guide hole 146. An element of the biasing force in the extending direction of the guide hole 146 is used for disengaging the retention shaft portion 166d of the connection pin 166 from the second opening construction portion 153b of the outside handle lever 150. Thus, in the cancellation mechanism 200, because the operational amount of the closing operation of the inside handle 61, that is, the rotary amount of the inside handle lever 140 changes in accordance with the stop position of the motor power transmission lever 160, the retention shaft portion 166d of the connection pin 166 may securely disengage from the second opening construction portion 153b of the outside handle lever 150 even in a case where the motor power transmission lever 160 stops at any position. The cancellation mechanism 200 for releasing the connection between the outside handle lever 150 and the motor power transmission lever 160 may be constructed with a simple structure, that is, the connection pin 166.

Meanwhile, according to the cancellation mechanism 200, the inside handle lever 140 may be rotatable relative to the motor power transmission lever 160 by the closing operation of the inside handle 61 until the lever portion 145 of the cancellation lever 144 comes in contact with the connection pin 166 at the one end portion 146a of the guide hole 146. In this case, the guide hole 146 slides relative to the sliding shaft portion 166a of the connection pin 166. Thus, in an initial stage of the closing operation of the inside handle 61 (for example, when the inside handle 61 is in an initial state illustrated in FIG. 7), the connection pin 166 may establish a slidable state, so called an idling state, almost without being applied with a load relative to the guide hole 146. As a result, an operation feeling of the inside handle 61 at the initial state is not deteriorated.

Figure 12:
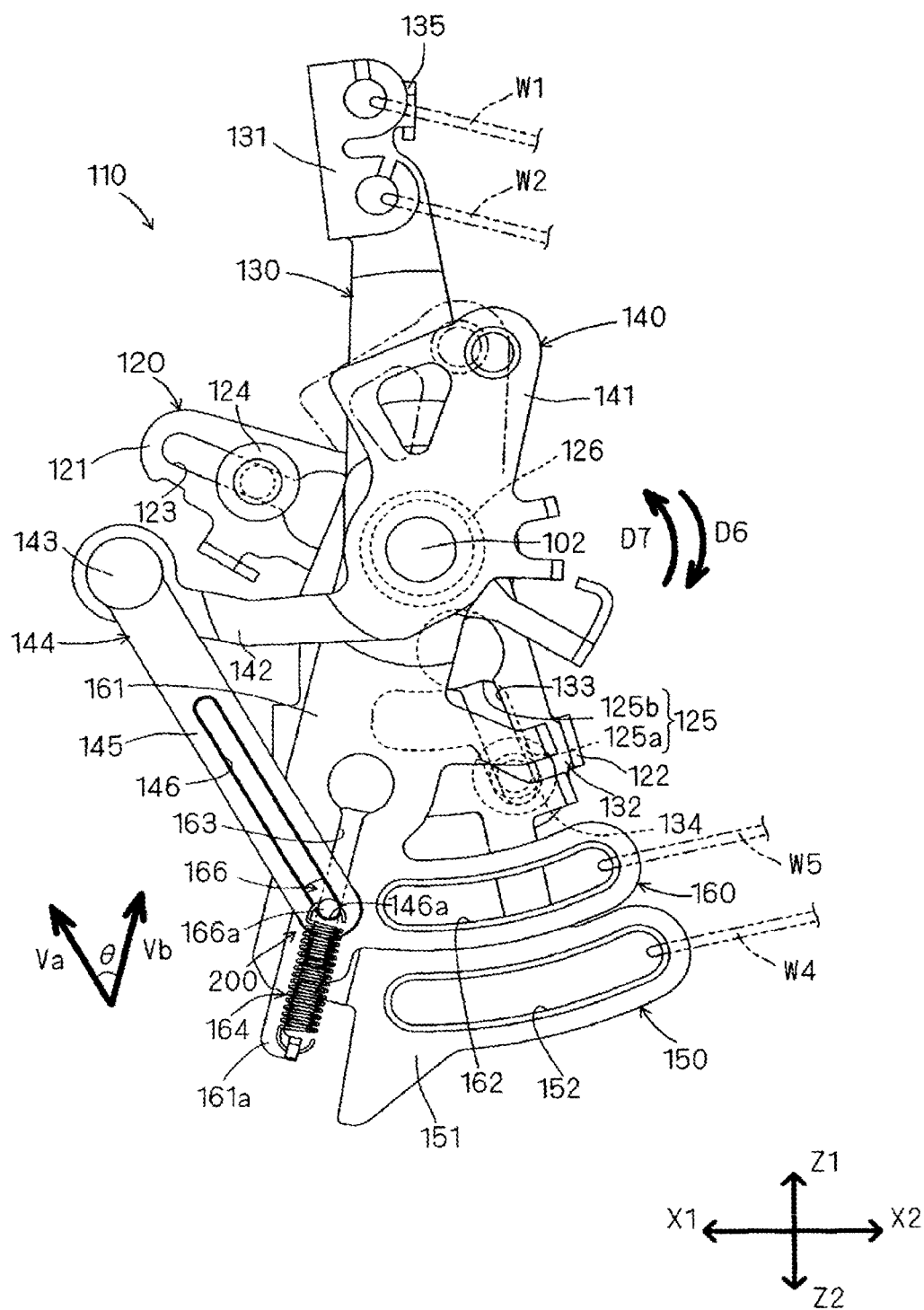
FIG. 12 is a side view illustrating a state where an inside handle lever 140 of the vehicle door operation device 110 that is in a release motor operation state performs a closing operation.
Figure 13:
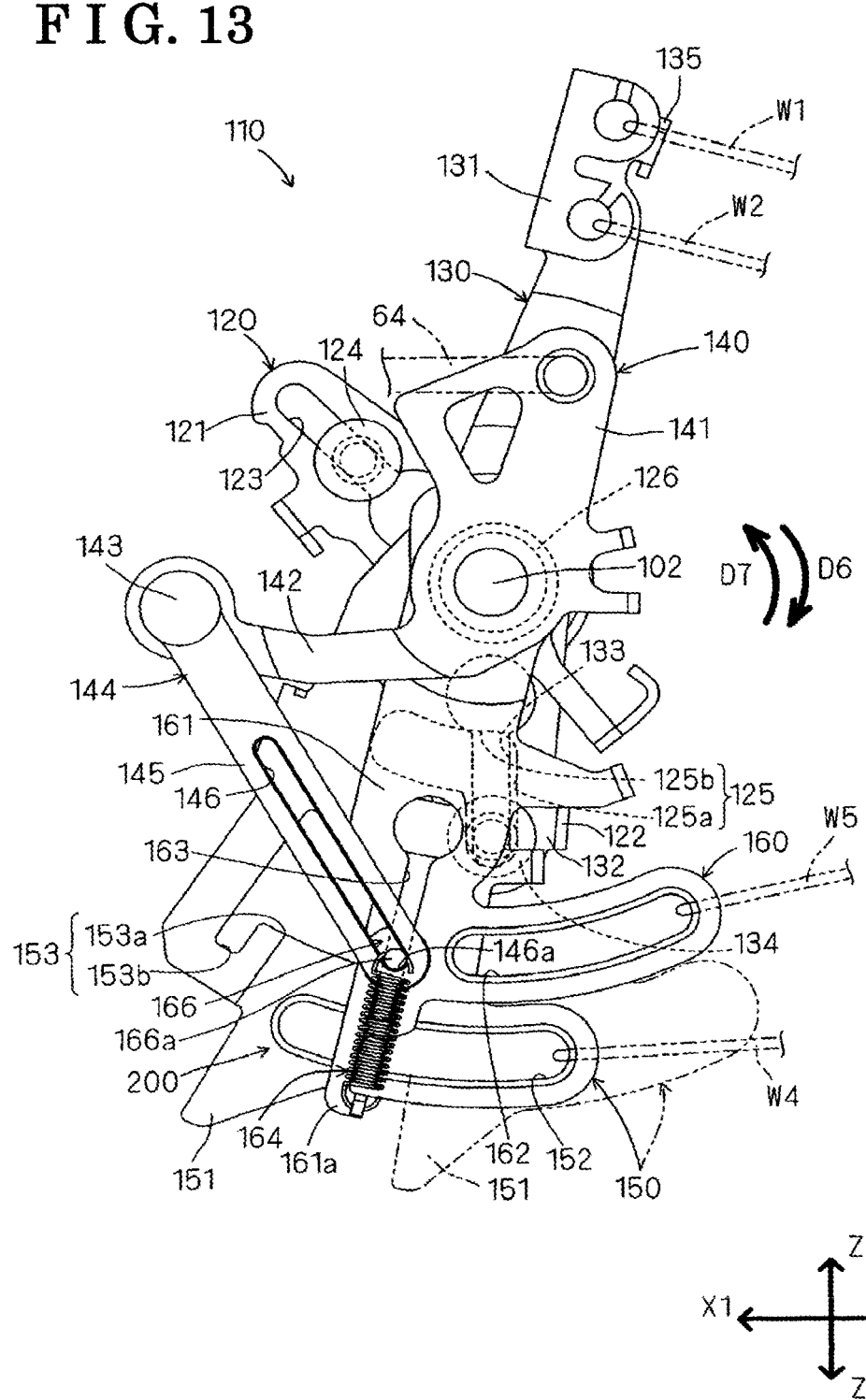
FIG. 13 is a side view illustrating a state where the open lever 130 of the vehicle door operation device 110 in FIG. 12 returns to the initial state.

Further, as referred to FIG. 12, it is favorable that the lever portion 161 of the motor power transmission lever 160 and the lever portion 145 of the inside handle lever 140 are configured such that an angle θ established by a direction vector Va and a direction vector Vb is an acute angle (specifically, it is favorable that the angle θ may be as small as possible). The direction vector Va relates to a pressing direction in which the sliding shaft portion 166a of the connection pin 166 is pressed at the one end portion 146a of the guide hole 146. The direction vector Vb relates to a sliding direction in which the sliding shaft portion 166a of the connection pin 166 slides on the guide hole 163 by the pressing at the one end portion 146a of the guide hole 146. Accordingly, when the inside handle lever 140 rotates until the one end portion 146a of the guide hole 146 comes in contact with the sliding shaft portion 166a of the connection pin 166 after the motor power transmission lever 160 stops, the loss of the rotary amount of the inside handle lever 140 (the operation amount of the inside handle 61) until the one end portion 146a of the guide hole 146 comes in contact with the sliding shaft portion 166a of the connection pin 166 may be minimized. As a result, the rotary amount of the inside handle lever 140 (the operation amount of the inside handle 61) required to disengage the retention shaft portion 166d of the connection pin 166 from the second opening construction portion 153b of the outside handle lever 150 after the motor power transmission lever 160 stops may be minimized.

As described above, according to the vehicle door operation device 110 of the present embodiment, the cancellation mechanism 200 may release the connection between the outside handle lever 150 and the motor power transmission lever 160 to disconnect the outside handle lever 150 from the motor power transmission lever 160. Accordingly, even in a state where the motor power transmission lever 160 stops at any rotary range between the initial position and the rotary end position, the open lever 130 along with the outside handle 150 may rotate by the elastic biasing force of the torsion spring 126 and returns to the initial position. As a result, the latch mechanism 22 appropriately returns to the closure retention state from the closure retention release state of the vehicle door 10. In this case, passengers of the vehicle may be able to deal with the failure relating to the release motor 65 by only operating the inside handle 61 without specifically worrying.

Because the guide hole 163 of the lever portion 161 extends along the normal line direction D8 relative to the virtual circle C formed in a case where the motor power transmission lever 160 rotates, the proportion of the rotary amount of the inside handle lever 140 and the sliding amount of the sliding shaft portion 166a of the connection pin 166 relative to the guide hole 163 may be constantly maintained in a state where the one end portion 146a of the guide hole 146 of the lever portion 145 comes in contact with the sliding shaft portion 166a of the connection pin 166 regardless of the stop position of the motor power transmission lever 160.

The present invention is not limited to the aforementioned typical embodiment, and may be variously applied and modified. For example, modes described below and applying the aforementioned embodiment may be employed.

Figure 14:
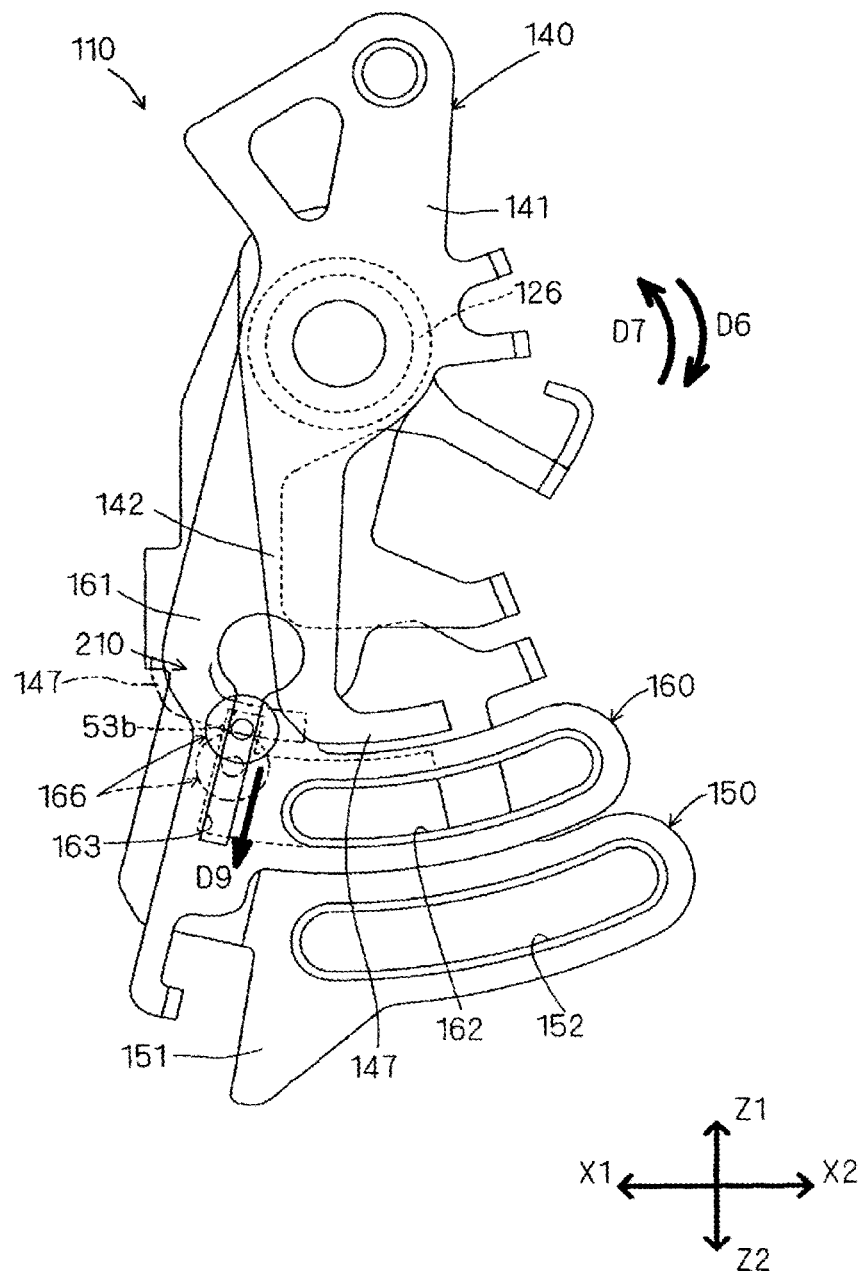
FIG. 14 is a view illustrating an overview structure of a cancellation mechanism 210 according to a modified example of a cancellation mechanism 200.

According to the cancellation mechanism 200 of the above described embodiment, the embodiment in which the cancellation lever 144 being rotatably supported by the cancellation lever support shaft 143 of the inside handle lever 140 moves the connection pin 166 has been described. Alternatively, according to the present invention, a member corresponding to the cancellation lever 144 may be excluded, and a mode in which the inside handle lever 140 directly moves the connection pin 166 may be adapted. In this case, for example, a cancellation mechanism 210 shown in FIG. 14 may be adapted. The cancellation mechanism 210 is configured to move the connection pin 166 using a cam portion 147 being provided at an arm end of the second lever arm 142 of the inside handle lever 140. The connection pin 166 is connected to the lever portion 161 via a torsion spring (not illustrated) and is retained at the second opening construction portion 153b of the outside handle lever 150 before being disconnected. Because the inside handle lever 140 rotates about the supports shaft 102 in the first rotary direction D6 in accordance with the closing operation of the inside handle 61, the cam portion 147 presses the connection pin 166 in a direction disengaging from the second opening construction portion 153b against the elastic biasing force of the torsion spring. Accordingly, the connection pin 166 disengages from the second opening construction portion 153b while moving the guide hole 163 of the lever portion 161 in a direction of an arrow D9. As a result, the connection between the outside handle lever 150 and the motor power transmission lever 160 may be released. Even in a case where the cancellation mechanism 210 is adapted, similarly to a case of the cancellation mechanism 200, the open lever 130 may return to the initial position.

According to the cancellation mechanism 200, 210 of the aforementioned embodiment and the mode, the embodiment and the mode in which the connection pin 166 moves from the connection position where the connection pin 166 connects the outside handle lever 150 and the motor power transmission lever 160 to the connection release position where the connection pin 166 releases the connection between the outside handle lever 150 and the motor power transmission lever 160 by using the rotary movement of the inside handle lever 140 in accordance with the closing operation of the inside handle 61 has been explained. According to the present invention, a mode in which the connection pin 166 moves from the connection position to the connection release position by using the rotary movement of the inside handle lever 140 in accordance with the opening operation of the inside handle 61 may be adapted.

According to the vehicle door operation device 110 of the aforementioned embodiment, the first guide hole 163 of the lever portion 161 is configured to extend along the normal line direction D8 relative to the virtual circle C formed in a case where the motor power transmission lever 160 rotates. According to the present invention, a configuration in which the first guide hole 163 extends so as to be orthogonal to the normal line direction D8 may be adapted.

According to the aforementioned embodiment, the remote control device 100 that is mounted to the sliding-type vehicle door 10 being provided at a vehicle rear seat has been described. According to the present invention, an essential structure of the remote control device 100 may be applied to a sliding-type vehicle door that is mounted to various portions of the vehicle.

The invention claimed is:

1. A vehicle door operation device comprising:
an open lever being configured to interlock with a latch mechanism for setting a sliding door in a closure retention state and a closure retention release state, the open lever being rotatable about a support shaft between a first position corresponding to the closure retention state and a second position corresponding to the closure retention release state, the open lever being constantly and elastically biased toward the first position by an elastic member;
an inside handle lever being configured to be connected to both of an inside handle being provided at a vehicle inner side of the sliding door and the open lever, the inside handle lever rotating the open lever toward the second position by rotating about the support shaft in accordance with an opening operation of the inside handle;
an outside handle lever being configured to be connected to both of an outside handle being provided at a vehicle outer side of the sliding door and the open lever, the outside handle lever rotating the open lever toward the second position by rotating about the support shaft in accordance with an opening operation of the outside handle;
a motor power transmission lever being connected to the outside handle lever via a connection member so as to rotate the open lever toward the second position by receiving a power of a release motor when the release motor is in operation to rotate about the support shaft from an initial position to a rotary end position; and
a cancellation mechanism moving the connection member from a connection position where the connection member connects the outside handle lever and the motor power transmission lever to a connection release position where the connection member releases the connection between the outside handle lever and the motor power transmission lever by using a rotary movement of the inside handle lever in accordance with a closing operation of the inside handle when the motor power transmission lever stops at a rotary range between the initial position and the rotary end position when the release motor is in operation,
wherein the cancellation mechanism includes
a first lever portion in which an elongated first guide hole is provided to penetrate the motor power transmission lever;
a cancellation lever rotatably supported by a cancellation lever support shaft provided at a position of the inside handle lever, the position being away from the support shaft;
a second lever portion in which an elongated second guide hole extending in a direction orthogonal to an extending direction of the first guide hole is provided to penetrate the cancellation lever;
a connection pin serving as the connection member, the connection pin including a sliding shaft portion slidable both on the first guide hole of the first lever portion and the second guide hole of the second lever portion, and a retention shaft portion being retained at a recessed portion of the outside handle lever at the connection position, the retention shaft portion disengaging from the recessed portion at the connection release position; and
an elastic connection member elastically connecting the connection pin and the motor power transmission lever such that the retention shaft portion of the connection pin is retained by the recessed portion at the connection position; wherein in a process in which the inside handle lever rotates in accordance with the closing operation of the inside handle, the second lever portion of the cancellation lever disengages the retention shaft portion of the connection pin from the recessed portion while sliding the sliding shaft portion of the connection pin on the first guide hole of the first lever portion by pressing the sliding shaft portion at one end portion of opposing end portions of the second guide hole against an elastic biasing force of the elastic connection member.

2. The vehicle door operation device according to claim 1, wherein the first guide hole of the first lever portion extends along a normal line direction relative to a virtual circle formed in a case where the motor power transmission lever rotates.

3. The vehicle door operation device according to claim 1, wherein the first lever portion and the second lever portion are configured such that an angle established by a direction vector relating to a pressing direction in which the sliding shaft portion of the connection pin is pressed at the one end portion of the second guide hole and by a direction vector relating to a sliding direction in which the sliding shaft portion of the connection pin slides at the first guide hole by being pressed at the one end portion of the second guide hole is an acute angle.

4. The vehicle door operation device according to claim 1, wherein the cancellation lever support shaft for the cancellation lever is provided at a lever arm extending so as to be away from a range where the support shaft for the inside handle lever is provided.

5. The vehicle door operation device according to claim 4, wherein the lever arm of the inside handle lever extends longitudinally along a front-rear direction of the vehicle.

\* \* \* \* \*